March 7, 1950 — W. C. KOGER — 2,499,511
HOG CATCHER AND HOLDER
Filed March 26, 1946
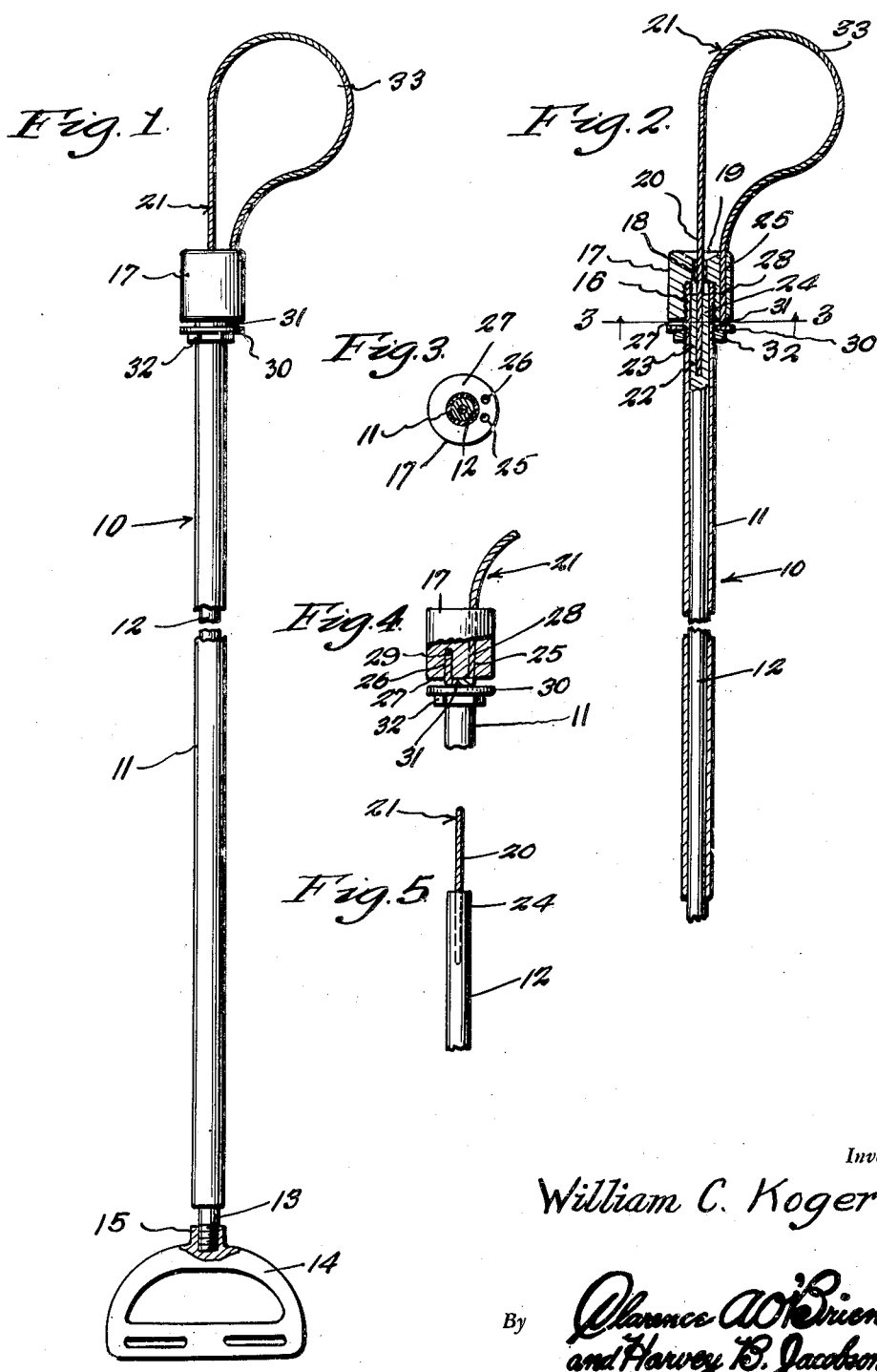
Inventor
William C. Koger Patented Mar. 7, 1950

2,499,511

UNITED STATES PATENT OFFICE 2,499,511

HOG CATCHER AND HOLDER

William C. Koger, London, Ohio

Application March 26, 1946, Serial No. 657,131

2 Claims. (Cl. 119—153)

The invention disclosed in the following specification taken with the accompanying drawings has for its primary object to provide a simple, inexpensive and rapid means whereby one may catch and secure a hog of any size for treatment or operation.

The invention, one form of which is illustrated in the accompanying drawings and described in the specification to follow, has for one of its objects to provide a hog catcher and holder the parts of which are separable and interchangeable for renewing when necessary.

A still further object of the invention is to provide a cable holding head from a hog catching device so formed that the cable may be quickly attached thereto or removed therefrom if broken or worn beyond usefulness.

Other features and advantages will become more readily apparent from the following description and the accompanying illustrative drawings in which:

Figure 1 is an elevational view of the invention,

Figure 2 is a longitudinal sectional elevational view thereof,

Figure 3 is a sectional view taken on line 3—3 of Figure 2,

Figure 4 is a detail elevational view of a head member, and

Figure 5 is a broken away detail view of a cable connection.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 has reference to the complete invention which consists of a tube 11 within which is telescopically mounted a rod 12 having a threaded outer terminal 13 upon which the handle 14 is screwed by means of its female threaded socket 15.

The end 16 of the tube 11 is threaded to receive the internally threaded head member or cap 17. This cap is provided with a reduced outer bore 18, terminating in a countersink 19, the bore being of a diameter to permit the end 20 of a cable 21, to slide freely therethrough. The inner end 22 of said cable is welded, or otherwise secured into a bore 23 in the inner end 24 of the rod 12.

The cap 17 is of a diameter sufficiently larger than that of the tube 11 to provide for a bore 25 extending longitudinally therethrough and a bore 26 extending partially therethrough from its inner surface 27. The end 28 of the cable 21 is threaded through bore 25 and returned as at 29 and projected into bore 26 (see Figure 4) after which a washer 30 on said end 24 is seated against the exposed head 31 of the cable and the lock nut 32 screwed tightly thereagainst in order to secure said cable fixed at the end and forming the snoot engaging noose 33, the cable forming the noose being constructed of a series of flexible wires.

When a hog is caught with the noose 33, the handle 14 is slipped over a convenient hook and will be securely held, as the harder the hog pulls, the tighter the noose grips it and the greater the pain so it will not pull too hard but be still for handling. Upon pushing in the rod 12 the noose will at once release the hog.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. A hog catching and holding device comprising a tube, a rod slidably mounted therein, a cable having one end fixed to the rod, means whereby the other end of the cable may be clamped relative to the tube forming a hog snout engaging noose, said clamp means including a screw cap having bores through which said other end is threaded, said bores being parallel with the tube and with one another, said other end being returned and its extremity inserted into one of the bores forming a bend, said clamp means also including a washer on the tube and engaging the bend, and a nut on the tube screwed upon the washer.

2. A hog catching and holding device comprising a tube, a rod slidably mounted therein, a cable having one end fixed to the rod, means whereby the other end of the cable may be clamped relative to the tube forming a hog snout engaging noose, said clamp means including a screw cap having bores through which said other end is threaded, said bores being parallel with the tube and with one another, said other end being returned and its extremity inserted into one of the bores forming a bend, said clamp means also including a washer on the tube and engaging the cable at said bend therein, a nut screwed onto said tube and engaging the washer, said nut and washer being on the side of said screw cap remote from said noose.

WILLIAM C. KOGER.

REFERENCES CITED

The following references are of record in the file of this patent:

UNITED STATES PATENTS

| Number | Name | Date |
|---|---|---|
| 750,797 | Bidwell | Feb. 2, 1904 |
| 959,422 | Bechdolt | May 24, 1910 |
| 999,840 | Nelson | Aug. 8, 1911 |
| 1,152,165 | Furnstahl | Aug. 31, 1915 |
| 1,388,664 | Officer | Aug. 23, 1921 |
| 1,393,527 | Guthrie | Oct. 11, 1921 |